United States Patent
Baek et al.

(10) Patent No.: US 9,011,708 B2
(45) Date of Patent: Apr. 21, 2015

(54) THERMAL INSULATOR USING CLOSED CELL EXPANDED PERLITE

(75) Inventors: Bum-Gyu Baek, Ulsan (KR); Sang-Yun Lee, Asan-si (KR)

(73) Assignee: Kyungdong One Corporation, Seoul (KR)

( * ) Notice: Subject to any disclaimer, the term of this patent is extended or adjusted under 35 U.S.C. 154(b) by 325 days.

(21) Appl. No.: 13/582,726

(22) PCT Filed: Mar. 3, 2011

(86) PCT No.: PCT/KR2011/001454
§ 371 (c)(1),
(2), (4) Date: Sep. 4, 2012

(87) PCT Pub. No.: WO2011/108856
PCT Pub. Date: Sep. 9, 2011

(65) Prior Publication Data
US 2012/0326072 A1    Dec. 27, 2012

(30) Foreign Application Priority Data
Mar. 5, 2010  (KR) ........................ 10-2010-0020108

(51) Int. Cl.
| | |
|---|---|
| H01B 3/02 | (2006.01) |
| H01B 3/48 | (2006.01) |
| C04B 38/00 | (2006.01) |
| C04B 14/38 | (2006.01) |
| C04B 26/02 | (2006.01) |
| C04B 14/18 | (2006.01) |
| C04B 28/02 | (2006.01) |
| B28B 23/00 | (2006.01) |
| C04B 28/26 | (2006.01) |
| C04B 111/28 | (2006.01) |

(52) U.S. Cl.
CPC ............... *C04B 26/02* (2013.01); *C04B 14/185* (2013.01); *C04B 28/02* (2013.01); *C04B 2111/28* (2013.01); *B28B 23/0087* (2013.01); *C04B 28/26* (2013.01); *Y10S 106/02* (2013.01)

(58) Field of Classification Search
USPC .................. 252/62; 106/675, 698, DIG. 2
See application file for complete search history.

(56) References Cited

U.S. PATENT DOCUMENTS

| | | | | |
|---|---|---|---|---|
| 5,098,504 A | * | 3/1992 | Motoki | .......................... 156/305 |
| 5,114,617 A | | 5/1992 | Smetana et al. | |
| 5,827,457 A | | 10/1998 | Tseng | |
| 5,964,934 A | * | 10/1999 | Englert | ...................... 106/287.1 |
| 6,340,389 B1 | | 1/2002 | Klus | |

FOREIGN PATENT DOCUMENTS

| | | |
|---|---|---|
| CN | 1 220 246 A | 6/1999 |
| CN | 101 152 976 A | 4/2008 |
| EP | 0 924 341 A1 | 6/1999 |
| GB | 1000136 A | 8/1965 |
| JP | H06-144913 A | 5/1994 |
| KR | 10-1995-0017812 A | 7/1995 |
| KR | 20-0350638 Y1 | 5/2004 |
| KR | 10-2006-0012497 A | 2/2006 |
| KR | 10-2006-0091214 A | 8/2006 |
| WO | WO 90/14319 A | 11/1990 |
| WO | WO 03/016232 A1 | 2/2003 |

OTHER PUBLICATIONS

Derwent-Acc-No. 2009-N05096 (abstract of Chinese Patent Specification No. CN 101508593 A) (Aug. 2009).*
Derwent-Acc-No. 2009-S00641 (abstract of Chinese Patent Specification No. CN 101585687 A) (Nov. 2009).*
Derwent-Acc-No. 2010-P52000 (abstract of Chinese Patent Specification No. CN 101857410 A) (Oct. 2010).*
Korean Patent Specification Application No. 10-2006-0012497 Machine Translation (Feb. 2006).*
PCT International Search Report, PCT/KR2011/001454, Nov. 4, 2011, 5 Pages.

* cited by examiner

*Primary Examiner* — Anthony J Green
(74) *Attorney, Agent, or Firm* — Fenwick & West LLP (57) ABSTRACT

The present invention relates to a thermal insulator using closed cell expanded perlite. The thermal insulator using closed cell expanded perlite of the present invention includes: expanded perlite 10 to 84 wt %ç, including dried and expanded perlite ore particles, having a surface with a closed cell shape, as an active ingredient; a liquid binder 15 to 85 wt %; and a reinforcing fiber 0.25 to 5 wt %. Accordingly, the present invention provides a thermal insulator, which enhances the rigidity of expanded perlite, minimizes porosity and gaps between the expanded perlite particles, by reducing compression ratio during compression molding, which results in lower density, improves constructability by lowering thermal conductivity, reduces material and energy costs and can reduce the area required for equipment installation by reducing the thickness of the thermal insulator.

15 Claims, 2 Drawing Sheets

THERMAL INSULATOR USING CLOSED CELL EXPANDED PERLITE

TECHNICAL FIELD

The present invention relates to a thermal insulator using closed cell expanded perlite, and particularly, to a thermal insulator, which can improve constructability by low density by using hollow closed cell expanded perlite having no acicular structure on a surface thereof, reduce material and energy costs and reduce the area required for equipment installation by reducing the thickness of the thermal insulator due to excellent thermal conductivity.

BACKGROUND ART

In the plant industry such as petroleum chemistry, power plants, steel mills and the like, the production process and lines thereof are composed of complex structures.

In particular, lines for storing fluids at high or low temperature or lines for transferring fluids are often used.

An industrial thermal insulator plays a very important role because the thermal insulator prevents energy from being lost in the high temperature or low temperature part plant industry and has a close relationship with product quality.

In particular, countries mostly dependent on imports of energy sensitively cope with effects such as reduction of energy due to high oil prices, regulation of carbon emission in accordance with convention on climate change and the like throughout the industry.

According to these trends, research and efforts have also been continuously made for developing materials in various fields and improving performance thereof also in thermal insulators used in industrial plants.

Inorganic fiber-based, powder-based and foam-based thermal insulators are usually used in the industrial thermal insulator.

Fiber-based thermal insulators are manufactured by using glass wool which uses glass-based minerals such as silica sand, limestone, feldspar, soda ash and the like as materials, rock wool which uses blast furnace slag and basalt as materials and inorganic fibers such as alumina-based fiber, zirconia fiber, carbon fiber and the like.

As publicly disclosed in various literatures such as Korean Patent No. 10-0522568 "Water-vaporable adiabatic pipe by using glass fiber and its manufacturing method", Korean Patent No. 10-0760003 "Glass fiber insulating material of curved type for heat-retaining and its manufacturing method" and the like, a mat is produced by using long glass fiber among the group of inorganic fibers, the mats being superimposed thereon with a plurality of layers are again needle-punched, and a binder is impregnated and bonded to manufacture a product.

The product manufactured by the method is advantageous in that it is easy to transport the product due to characteristics of a fiber form and the product has lower thermal conductivity than inorganic fiber-based thermal insulators in the related art, but is disadvantageous in that the density variation of the product is so large that thermal characteristics are not uniform.

In particular, the product is so vulnerable to moisture that even when the surface thereof is subjected to water repellency treatment, characteristics of the fiber allow moisture to easily penetrate into the cross-section thereof and the like and as a result, there are problems in that cracks are generated on mats being superimposed thereon with a plurality of layers and thus thermal conductivity is sharply increased and the durability of the product deteriorates.

Further, dust of glass fiber generated during construction is harmful to the human body and thus efforts to prevent the generation of dust at work sites are also exerted.

Powder-based thermal insulators are manufactured by using calcium silicate, diatomaceous earth, basic magnesium carbonate and the like.

In particular, a calcium silicate thermal insulator, which is usually used among them, is a product cured by subjecting diatomaceous earth and slaked lime to hydrothermal reaction in excess of water, wet-molding the mixture in a slurry state and heating the mixture at high pressure in an autoclave.

The shapes of tobermorite and xonotlite are advantageous in excellent rigidity according to the crystal structure during curing and lowered thermal conductivity according to the crystal shapes, but the manufacture process according to the curing is complicated and thus productivity is low. In particular, in the case of tobermorite, there is a problem in that water repellent performance may not be improved.

A foam-based thermal insulator is a thermal insulator using expanded vermiculite or expanded perlite, and an expanded perlite thermal insulator is usually used for industrial use.

The expanded perlite thermal insulator is advantageous in that the thermal insulator has a simple manufacturing process, high productivity and low material costs, and thus has been used throughout the industrial thermal insulator.

However, expanded perlite as a raw material has an extremely small amount of small particles which fill gaps between particles whereas the particle size distribution thereof is extremely skewed toward large particles having an open cell shape with an acicular structure.

For this reason, gaps between particles are increased and the overall porosity is formed at high levels, and thus there is a problem in that expanded perlite cells are destroyed by compression during the molding process and thus thermal efficiency deteriorates.

In addition, when open cell expanded perlite with an acicular structure is manufactured, the amount of a silicate-based binder used is increased because the absorptivity of the silicate-based binder as an inorganic binder is high, and the silicate-based binder per se has an amorphous shape and thus is disadvantageous in that expanded perlite thermal insulators have higher thermal conductivity than glass fiber-based or powder-based hydrate thermal insulators, or lower rigidity than powder-based hydrate thermal insulators.

Various research and developments (R&D) have been made in order to solve the problems, but the focus of the R&D has been placed on manufacture methods rather than on improving expanded perlite per se, and thus there is a limitation in overcoming the deterioration of thermal conductivity resulting from compression molding, and as methods of sintering, curing or the like have been suggested in the drying process for reinforcing rigidity, there are problems in that the manufacture process is complicated and manufacture costs are increased and the like.

Furthermore, even in the case of expanded perlite per se, various inventions are disclosed as follows.

In Japanese Patent Application No. 2007-320805 "Hard foamed perlite and its manufacturing method", the manufacturing of fine globular hard foamed perlite having a high rigidity by adjusting the conditions of sintering for each compression strength of expanded perlite is disclosed.

In U.S. Pat. No. 5,005,696 "Round Baler", the manufacturing of globular expanded perlite by using an indirect heat type expanded sintering furnace is disclosed.

However, the above-described inventions reinforce the rigidity by using globular shapes and just allow the absorption of water or oil to be achieved in a low level and thus have problems in that the specific gravity of expanded perlite is high because only globular non-porous property is pursued, the wall between internal cells becomes thick and as a result, the reinforcement of rigidity is achieved during the manufacture of a thermal insulator, but adverse effects are rather obtained from thermal conductivity.

PRIOR ART DOCUMENT

Patent Document (Patent Document 1) Korean Patent No. 10-0522568 "Water-vaporable adibatiz pipe by using glass fiber and its manufacturing method"

(Patent Document 2) Korean Patent No. 10-0760003 "GLASS FIBER INSULATING MATERIAL OF ROUND TYPE FOR HEAT-RETAINING EQUIPMENT AND ITS MANUFACTURING METHOD"

(Patent Document 3) Japanese Patent Application No. 2007-320805 "Hard foamed perlite and its manufacturing method"

(Patent Document 4) U.S. Pat. No. 5,005,696 "Round Baler"

DETAILED DESCRIPTION OF THE INVENTION

Technical Problem

Thus, the present invention has been made to solve the above-described problems, and an object of the present invention is to minimize the particle crushing and cell structure destruction of expanded perlite during compression molding by manufacturing most of the expanded perlite in the form of a hollow closed cell having no acicular structure on the surface thereof to maximally lighten a unit particle and improve the rigidity of expanded perlite and by compactly filling the body such that gaps between particles are maximally filled by appropriately controlling the particle size distribution of large particles, intermediate particles and small particles in order to prevent expanded perlite from being crushed due to large gaps between particles during compression molding.

Another object of the present invention is to provide a thermal insulator using expanded perlite, which may lower the thermal conductivity by radiation and conduction and allow more improved rigidity and hardness to be obtained because a thermal insulator with a much lower density may be manufactured by decreasing the amount of a silicate-based binder to penetrate into expanded perlite while the surface of expanded perlite becomes a closed cell shape and decreasing the specific surface area to be coated due to removal of the acicular structure on the surface thereof to use only the amount of the binder, which imparts adhesion on the surface thereof.

Technical Solution

In order to achieve the above-described objects, the thermal insulator using closed cell expanded perlite of the present invention includes: expanded perlite 10 to 84 wt %, including hollow dried and expanded perlite ore particles, having a surface with a closed cell shape, as an active ingredient; a liquid binder 15 to 85 wt %; and a reinforcing fiber 0.25 to 5 wt %.

A method for manufacturing a thermal insulator using closed cell expanded perlite of the present invention includes: a first step of drying perlite ore, controlling the wt % of crystal water based on the weight of perlite and then expanding the perlite ore, in which hollow particles, having a surface with a closed cell shape, are expanded to manufacture expanded perlite such that the particles are composed to have a certain particle size distribution, a second step of preparing a mixed material by adding a liquid binder and a reinforcing fiber to the expanded perlite manufactured in the first step and mixing the resulting mixture, a third step of manufacturing a molded body by compressing the mixed material prepared in the second step and a fourth step of drying the molded body manufactured in the third step.

During the manufacture of the molded body in the third step, the mixed material in the second step is further subjected to a body compact filling method which imparts vibration or shock, and then is compressed to manufacture the molded body.

Further, in the drying process in the fourth step, drying may be performed by using direct or indirect hot wind, or microwave.

Advantageous Effects

By the above-described solution means, the thermal insulator of the present invention may be used in high or low temperature processes such as in industrial plants and the like as a thermal insulator, which can minimize gaps between the expanded perlite particles by compactly filling the body maximally by using hollow closed cell expanded perlite to improve constructability due to low density, and can reduce material and energy costs and reduce the area required for equipment installation by reducing the thickness of the thermal insulator.

EMBODIMENTS

Hereinafter, preferred embodiments of the present invention will be described in detail as follows with reference to the accompanying drawings.

First, a method for manufacturing a thermal insulator using expanded perlite in the related art includes: an expanding process of allowing mineral phase perlite to have open cell expanded perlite, in which the expanding process includes a mixing process of mixing the mineral phase perlite with an inorganic binder, a molding process of allowing the mixture to have a target shape, and a drying process of physically removing moisture of the liquid inorganic binder.

If the above-described expanding process is described in more detail, perlite is usually classified into natural minerals such as pearlstone, pitchstone, obsidian and the like, and also includes pumice having other similar performances (hereinafter, collectively referred to as the ore).

Ore may have different water contents according to the kinds thereof, but contains moisture which is called crystal water in the inside thereof, and when ore is passed through a flame at high temperature in the sintering process, the surface thereof is hyalinized and moisture in the inside thereof is evaporated to expand the ore.

Generally, an expanded perlite thermal insulator is greatly affected by conduction and radiation.

In the case of the same material, conduction is mostly affected by the density of the material, and when the material is light, conduction is low, while the heavier the material is, the higher the conduction tends to be.

The effects of radiation on heat transfer increase as radiation goes from a low temperature region to a high temperature region. In other words, radiation is affected by the shape and size of the cells that expanded perlite particles have, and the smaller the size and the more the number of cells with a closed cell shape are, the lower the heat transfer by radiation is, and the larger the size and the less the number of cells with an open cell shape are, the higher the heat transfer is.

However, when a thermal insulator is manufactured to have a low density in order to improve the heat transfer of expanded perlite, insufficient rigidity of expanded perlite per se is caused and thus the criteria thereof now commonly used almost reaches the limit thereof. When the perlite is slightly expanded such that the specific weight of unit particle of the expanded perlite as a material used is greater than the limit thereof, the size of internal cells is increased by the overexpansion and the separation membrane of the cell becomes thin and as a result, the surface of the particles burst open and thus the expanded perlite becomes an open cell shape with an acicular structure, and the specific weight thereof becomes rather heavy due to peeled pieces.

Accordingly, as the open cell shape on the surface thereof becomes severe, the internal cell is also increased, heat transfer by radiation is increased, and the rigidity of particles is decreased, thereby also decreasing the rigidity of the thermal insulator. If the rigidity of the thermal insulator is to be increased, the amount of expanded perlite used during molding is rather increased to increase the density thereof, thereby increasing the heat transfer by conduction, which has been considered as a problem.

In order to solve the problems, the core technology of the present invention for maximizing the performance of an expanded perlite thermal insulator will be first described and then the advantages and characteristics thereof will be additionally described as follows.

First, the present invention produces a shape of a hollow closed cell which has no acicular structure on the surface of most of the expanded perlite and is strong in terms of particle rigidity by minimizing the generation of open cells while maximally lightening the specific weight of expanded perlite in order to decrease thermal conductivity.

Firstly, in order to produce a hollow closed cell expanded perlite having no acicular structure on the surface thereof, the expanded perlite may be prepared such that a shape of the expanded perlite becomes a hollow closed cell shape without an acicular structure on the surface thereof when the overexpansion is suppressed by controlling the amount of internal crystal water through drying.

On the contrary, when the amount of crystal water is too small, the perlite is not expanded or the expansibility deteriorates and the specific weight of particles is increased. Therefore, the wt % of crystal water based on the total weight of perlite needs to be controlled to expand the perlite.

Moreover, the degree of controlling of crystal water is different according to the amount and characteristics of crystal water in perlite ore and thus may not be uniformly determined, but the degree may be confirmed through direct experiments according to the kind of ore.

However, although the wt % of crystal water is constantly controlled, in general, the larger the particle size of perlite is, the greater the absolute amount of crystal water is when the particle size of perlite is more than 400 μm, and thus when crystal water is vaporized to expand perlite, the pressure is increased and the surface is destroyed, thereby generating a large amount of open cells.

Accordingly, the wider the particle size distribution of perlite regular stone (herein defining crystallized perlite) in the preparation process thereof is, the more difficult it is for larger particles to be manufactured into closed cells.

In addition, particles with a size less than 65 μm easily cause non-expansion. Thus, perlite needs to be expanded by using a method for removing the particles with a size less than 65 μm in advance from the perlite regular stone such that those particles are not generated in the sintering process, reducing the number of large particles in the total particle size distribution, and appropriately narrowly designing the particle size distribution.

Most of the thus-prepared particles with a size less than 63 μm have a hollow shape unlike perlite in the related art and thus are definitely different in thermal conductivity or particle rigidity, and fine particles with the insulation performance secured are significantly helpful in filling gaps between particles, thereby rather playing a preferred role.

At this time, examples of an expansion method generally used include a direct flame method (a method of allowing flame to directly touch a raw material), an indirect flame method (a method of not allowing flame to touch a raw material) and the like, and also include a method of expanding perlite falling within a target particle size distribution range at one time and a method of expanding perlite with each particle size and mixing the individual perlite to fall within a target particle size distribution range.

For most of the expanded perlite manufactured by these methods, small particles are formed in the form of several cells in the inside of the expanded perlite, and as the size of perlite particles increases, a large number of cell aggregates form a hollow closed cell shape with a high particle rigidity, so that perlite may be expanded to have a lighter specific weight.

However, although these methods may be used, all of the expanded perlite may not be manufactured into a completely hollow closed cell shape. Due to characteristics of vertical and horizontal expansion furnaces which are generally used, about 10 to 30% of the particles also have a shape of an open cell according to the interval of particle size, and also for expanded perlite manufactured into a closed cell shape, some of the surface thereof sometimes becomes an open cell due to collision during the expansion process or the transfer in the air, and thus about 70 to 80% of particles commonly become a closed cell.

Nevertheless, it is not always required that the range of the closed cell in the present invention is applied to the limited numerical values as described above to be used. This is due to the fact that there is a difference according to the kind of ore and the equipment conditions and the effects are significantly improved even when the closed cell accounts for approximately 50%, compared to expanded perlite in the related art.

The characteristics of the present invention, which have been described above, will be described in detail as follows through FIGS. 1 and 2.

Figure 1:
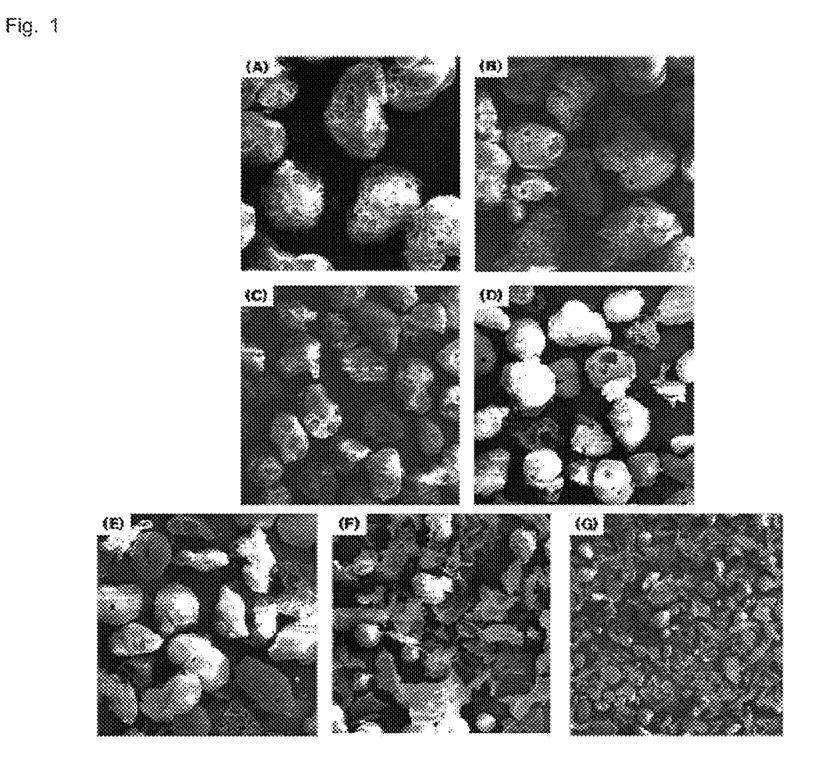
FIG. 1 is a view illustrating expanded perlite for thermal insulator in the related art.
(A): More than 800 μm (30 magnifications) (B): 500 to 800 μm (32 magnifications) (C): 500 to 400 μm (32 magnifications) (D): 250 to 400 μm (48 magnifications) (E): 250 to 160 μm (84 magnifications) (F): 63 to 160 μm (100 magnifications) (G): 63 μm (100 magnifications)
Figure 2:
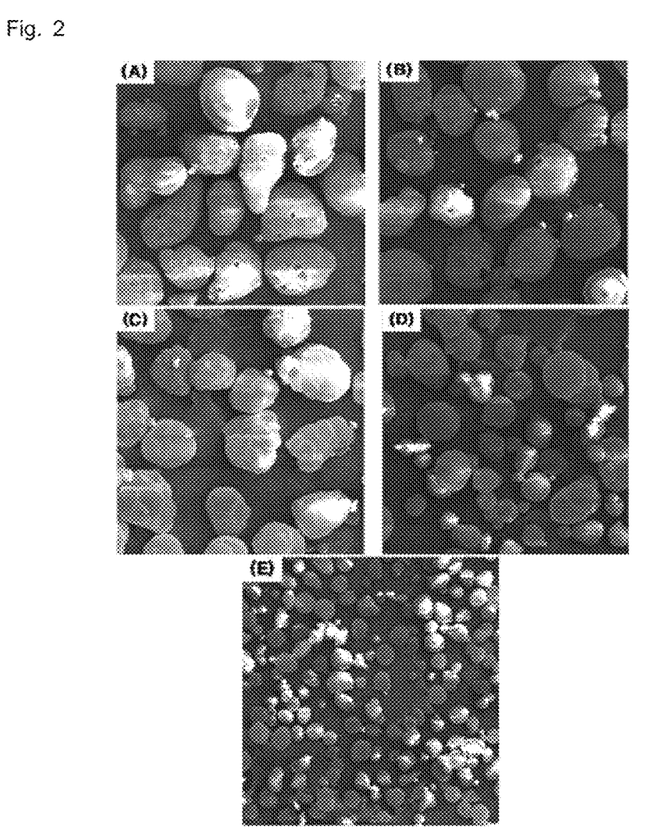
FIG. 2 is a view illustrating expanded perlite of the present invention.
(A): More than 400 μm (32 magnifications) (B): 250 to 400 μm (48 magnifications) (C): 160 to 250 μm (84 magnifications) (D): 63 to 160 μm (100 magnifications) (E): 63 μm (100 magnifications)

That is, FIG. 1 is a view illustrating scanning electron microscope photos of expanded perlite for a thermal insulator in the related art, and FIG. 2 is a view illustrating scanning electron microscope photos of expanded perlite of the present invention.

Referring to FIG. 1, it may be confirmed that most of the particles in expanded perlite for a thermal insulator in the related art entirely show an open cell form and many acicular particles are formed on the surface thereof, (E) pieces broken by overexpansion are included in particles having a size of 250 μm or less, (F) the amount of crushed pieces included in particles having a size of 160 μm or less is increased by a half or more, and (G) most of the particles having a size of less than 63 μm, which even have no cells, are crushed powder and a substantial amount of unexpanded particles are included.

Conversely, FIG. 2 illustrates expanded perlite of the present invention in which some open cells are shown partially by large particles having a size of approximately 400 μm, but this is actually a form limited only on the surface thereof and internal cells have individual independent cells and powder crushed by overexpansion is scarcely included. In particular, most of the particles having a size of less than 63 μm are hollow.

Therefore, in expanded perlite for a thermal insulator in the related art, a large amount of particles with a size of from 400 μm to 800 μm are present and a substantial amount of particles with a size of even 800 μm or more are present. Thus, the entire size of internal cell of expanded perlite is increased and the number of cells in the same volume is too small compared to the number of cells in expanded perlite of the present invention, and the heat transfer only further deteriorates due to an excessive amount of crushed powder (broken expanded perlite and crushed powder almost having no cells).

However, in the present invention, the thermal conductivity which affects the heat transfer the most may be reduced by minimizing the generation of open cells to manufacture most of the expanded perlite into a hollow closed cell shape which has a high particle rigidity so as to lighten the specific weight of the expanded perlite as maximally as possible.

Second, in order to prevent expanded perlite from being crushed due to large gaps between particles during the compression molding process, the body is compactly filled such that gaps between particles may be filled as maximally as possible by appropriately controlling the particle size distribution of large particles, intermediate particles, small particles and fine particles.

When the characteristics of the present invention described above are described by comparing a general method for manufacturing an expanded perlite thermal insulator, the molding process is performed as compression molding by press.

At this time, bulk state expanded perlite and a mixed material are introduced into a press, usually in a volume of about 3.5 times or more than the volume of a molded body to be manufactured.

At this time, if expanded perlite has a form of open cell acicular structure, the size of gaps between particles is so large and the rigidity of particles is so weak that particles and cells are often crushed during the compression molding process. On the contrary, if compression is not sufficiently performed, the molded state of a product deteriorates, thereby decreasing the rigidity and hardness of the product, which is problematic.

Further, in order to minimize gaps between particles, a method of mechanically introducing expanded perlite in a bulk state, performing body compact filling by vibration or shock and then performing compression molding has been applied. In the method, when expanded perlite per se has an open cell shaped acicular structure, the effects thereof are not significant, and the particle size distribution per se is not appropriate. Therefore, there is a limitation in ultimately reducing the gaps.

Therefore, an expanded perlite thermal insulator in the related art has problems in that expanded perlite per se has an open cell shaped acicular structure, particles per se have a weak rigidity and gaps between particles are large due to an inappropriate particle size distribution, and accordingly effects caused by radiation and conduction are increased due to crushing of expanded perlite particles and cell destruction generated during the compression molding process and thus the thermal conductivity is increased.

Thus, the present invention reinforces the rigidity of particles and cells per se by using a hollow closed cell expanded perlite having no acicular structure, and minimizes gaps between particles by appropriately controlling the particle size distribution of large particles, intermediate particles, small particles and fine particles, so that gaps between particles are very small, and the compactness is improved when the expanded perlite is introduced into a molding mold, thereby allowing molding to be achieved in a lower volume than the volume of expanded perlite in the related art. In addition, the present invention may minimize the crushing of expanded perlite particles and cells due to pressurization by allowing the expanded perlite to have a rigidity of the thermal insulator even at a low compression ratio.

That is, considering the ratio of the particle size distribution naturally occurring during the crushing process and based on a premise that a hollow closed cell expanded perlite having no acicular structure is manufactured, it is the most reasonable that the thermal insulator of the present invention has a bulk density of 20 to 40 kg/m$^3$, particles contained in expanded perlite have a particle size distribution that 15±10 wt % of particles with a size of more than 400 μm, 40±15 wt % of particles with a size of 250 to 400 μm, 20±10 wt % of particles with a size of 160 to 250 μm and 30±15 wt % of particles with a size of less than 160 μm are present based on the weight of expanded perlite, and gaps between particles may be minimized by the body compact filling as maximally as possible.

From the particle size of approximately 400 μm in the present invention, a substantial amount of open cells start to be generated even though the expansion of perlite is sufficiently controlled. The reason why the amount of particles with a particle size of 400 μm is increased is that even though the gaps between particles are minimized through an appropriate particle size distribution, some particles need to be crushed during compression molding and empty gaps need to be filled, and expanded perlite with a size of 400 μm or more has a weaker rigidity than particles with a size of 400 μm or less and thus can play such a role.

Furthermore, when the particle size is too small, there is a problem in that expanded perlite is aggregated during the mixing process with a liquid binder. In addition, since the inside of the thermal insulator becomes too compact due to compression molding, cracks are generated in the drying process and the like.

Nevertheless, it is not always required that the particle size distribution in the present invention is applied to the limited numerical values to be used.

In the present invention, from a particle size of approximately 400 μm, open cells are partially generated even though the expansion of perlite is sufficiently controlled, and it may be better to control the expansion of perlite based on 500 μm according to crystal water and degree of preheating.

More specifically, perlite is one of the natural resources and thus the crystal water and hardness of crude rock are different according to the production process of ore, and it is difficult to decide the criteria uniformly because results such as the rigidity and particle size of expanded perlite, generation ratio of open cells and the like may be different according to regular stone manufactured, degree of heating and kind of expansion furnace.

Moreover, because fine powder with a size of 200 mesh or less is frequently generated in a larger amount as the particle size is decreased during the crushing process of crude rock, it is practically impossible to maintain the ratio of the constant particle size distribution or constantly control the crushed particle size and get rid of the remnants and thus it may be preferred that the size of particles is rather increased within a range as much as possible.

Further, preparation may be achieved by one or more methods selected from a method of performing expansion at one time in accordance with a target particle size distribution range and a method of producing particles with each particle size and mixing the respective particles to obtain particles within a target particle size distribution range.

Third, the amount of a liquid inorganic binder used as a binding material is reduced to lower the effects of heat transfer.

In general, silicate as an inorganic binder used in the expanded perlite thermal insulator is a compound which is represented as $M_2OnSiO_2xH_2O$ in which M represents an alkali metal which belongs to the 1A Group of the Periodic Table, and n and x are an integer.

Specific examples of the alkali metal which belongs to the 1A Group include lithium, sodium, potassium and the like.

Liquid inorganic binders in the form of the silicate may be different according to the kind thereof, but most of them contain $H_2O$ in an amount of 50% or more.

These inorganic binders are used as a binding material of the expanded perlite thermal insulator, and are mixed with expanded perlite and inorganic fibers and subjected to a mixing process before compression molding.

At this time, expanded perlite in the related art has a large specific surface area due to a phenomenon in which open cell sites and crushed particles during expansion absorb a liquid binder, crushing and an acicular structure, and thus an excessive amount of a liquid inorganic binder needs to be used.

However, the closed cell expanded perlite of the present invention has the surface most of which is closed and a small amount of an acicular structure and thus is advantageous in that rigidity is secured even when a liquid inorganic binder is used in an amount of 80% or less compared to an amount of expanded perlite used in the same volume. In the present invention, expanded perlite is used in a smaller amount than the thermal insulator in the related art and thus the amount of the inorganic binder used is actually significantly reduced.

Silicate per se is an amorphous crystal and thus the thermal conductivity is high, and due to reduction in amount of the silicate used, the thermal insulator with a low density is manufactured and as a result, an effect that the influence of conduction is decreased is obtained.

Furthermore, moisture adversely affects the thermal conductivity, and the thermal insulator of the present invention is advantageous in that the thermal insulator of the present invention, which is used in a smaller amount thereof under the same drying conditions, has a lower content of moisture remaining in the thermal insulator by an inorganic binder.

Further, accordingly, the thermal insulator of the present invention is also advantageous in that energy costs and drying time may be saved.

Moreover, the liquid binder in the present invention may additionally use an organic binder, or may be used with an inorganic binder.

If a liquid binder may serve as a binding material, the liquid binder may be used for the thermal insulator. However, at this time, conditions of use in which the thermal insulator is applied need to be considered.

In general, in the use of the expanded perlite thermal insulator, a silicon-based water repellent is used in order to prevent the absorption of moisture which affects thermal conductivity.

Also in the present invention, a silicon-based water repellent in the related art may be used, but additionally, a silane monomer series may be coated in order to improve water repellency, reduce absorptivity, and improve fluidity (fluidity expressed herein refers to ease in position shift due to low effects of friction between particles and an angle of repose) and the like.

In the expanded perlite thermal insulator, a silicon-based water repellent is used in order to remove the effects of moisture, and when a silane-based monomer coating is applied thereto, each particle exhibits water repellency performance and advantageous effects to compact filling before compression molding may be exerted.

The silicon-based water repellent does not have reactivity on the surface of perlite, but has a form that silicon in the form of a siloxane oligomer is simply adhered, serves only as a water repellent, and fails to improve fluidity.

However, the silane-based monomer has alkoxy which induces a chemical bond with perlite at the terminal thereof and has an alkyl group showing water repellency characteristics at the tail thereof, and thus the monomer extends outward like tree branches or flocci from the entire surface of the perlite to form a layer, thereby reducing frictional resistance on the surface. As a result, fluidity is improved, and thus body compact filling is readily performed when the monomer is introduced into the compression molding process and effects of permanently having water repellency characteristics are obtained unlike silicon-based monomers in the related art.

In the present invention, as a water repellent using surface-coating which has an object of showing water repellent performance, not only an organic silane but also titanate-based and zirconate-based water repellents which may reinforce strength may be used, and more specifically, examples thereof include organic silane-based coupling agents including iso-octyltrimethoxysilane, methyltrimethoxysilane, octyltrietoxysilane, 3-aminopropyltriethoxysilane, 3-glycidyloxypropyltrimethoxysilane, 3-methacryloxypropyltrimethoxysilane, vinyltriethoxysilane, vinyltrimethoxysilane, vinyltri(2-methoxy-ethoxy)silane and the like, titanate-based coupling agents including neopentyl(diallyl)oxy, trineodecanonyl titanate, neopentyl(diallyl)oxy, tri(dodecyl)benzene-sulfonyl titanate, neopentyl(diallyl)oxy, tri(dioctyl)phosphato titanate, neopentyl(diallyl)oxy, tri(dioctyl)pyro-phosphato titanate, neopentyl(diallyl)oxy, tri(N-ethylenediamino)ethyl titanate, neopentyl(diallyl)oxy, tri(m-amino)phenyl titanate and the like, zirconate-based coupling agents including neopentyl(diallyl)oxy, trineodecanonyl zirconate, neopentyl(diallyl)oxy, tri(dodecyl)benzene-sulfonyl zirconate, neopentyl (diallyl)oxy, tri(dioctyl)phosphato zirconate, neopentyl (diallyl)oxy, tri(dioctyl)pyro-phosphato zirconate, neopentyl (diallyl)oxy, tri(N-ethylenediamino)ethyl zirconate, neopentyl(diallyl)oxy, tri(m-amino)phenyl zirconate and the like, and the like.

In order to reinforce the moldability, flexural strength, constructability and the like of the expanded perlite thermal insulator in the present invention, reinforcing fibers with a length of 5 to 30 mm are included. The reinforcing fiber uses each of an inorganic material-based fiber and an organic material-based fiber, or uses a mixture a mixture thereof.

In addition, a reinforcing agent may be used in order to additionally reduce strength or thermal conductivity.

In order to reinforce strength, fumed silica having a size of less than 50 μm or white carbon is used, and even though gaps between expanded perlite particles are filled before compression and the molding compression ratio is reduced, the compact molding state is obtained, thereby improving strength.

In order to reduce the thermal conductivity, a radiant heat blocking agent may be used.

When expanded perlite is converted from an open cell shape to a closed cell shape, the effects of radiation and conduction may be reduced, but as the temperature increases, the effects of radiation are enhanced and there is a limitation in blocking the effects by radiation. Thus, thermal conductivity may be further reduced by adding a material which additionally blocks radiation.

In particular, more significant effects are exhibited in the high temperature region.

For description in more detail based on what has been mentioned above, the present invention will be described in detail as follows with reference to Examples and Experimental Examples, but the scope of the present invention is not limited thereto.

Example 1

Manufacture of Thermal Insulator 1 Using Closed Cell Expanded Perlite of the Present Invention Perlite regular stone was used, and expanded perlite was manufactured, the expanded perlite having a density of 30 kg/m$^3$, a particle size distribution that 15 wt % of particles with a size of more than 400 μm, 40 wt % of particles with a size of 250 to 400 μm, 20 wt % of particles with a size of 160 to 250 μm and 30 wt % of particles with a size of less than 160 μm are present based on the total weight of the expanded perlite, and a closed cell ratio of 70 wt % according to the particle size interval.

A mixed material was prepared by adding 1.5 wt % of an inorganic fiber based on the weight of the expanded perlite to 1,000 g of the closed cell expanded perlite manufactured as above and mixing the mixture.

A liquid inorganic binder was prepared by adding 0.5 wt % of a silicon-based water repellent based on the weight of the sodium silicate to 1,000 g of 33Be' sodium silicate and mixing the mixture.

450 g of the mixture prepared as above and 413 g of the liquid inorganic binder prepared as above were mixed and then the resulting mixture was compressed by about 3.2 times the initial volume to manufacture a molded body with a size of 300*300*50 mm$^3$ (volume 4.5 L) (Herein, the compression ratio is not artificially adjusted, but means a compression ratio generated during the manufacture of 4.5 L of a molded body based on the bulk state volume when the amount of the mixture is introduced into a molding mold. The same also applies to Examples and Comparative Examples).

The molded body manufactured was dried at 200° C. in a convection dryer oven for 4 hours to manufacture a closed cell expanded perlite thermal insulator 1 having a density of 130±5 kg/m$^3$.

Example 2

Manufacture of Thermal Insulator 2 Using Closed Cell Expanded Perlite of the Present Invention The closed cell expanded perlite having a density of 30 kg/m$^3$ manufactured in Example 1 was prepared.

A mixed material was prepared by adding 1.5 wt % of an inorganic fiber based on the weight of the expanded perlite to 1,000 g of the closed cell expanded perlite manufactured as above and mixing the mixture.

A liquid inorganic binder was prepared by adding 0.5 wt % of a silicon-based water repellent based on the weight of the sodium silicate to 1,000 g of 33Be' sodium silicate and mixing the mixture.

405 g of the mixed material prepared as above and 365 g of the liquid inorganic binder prepared as above were mixed and then the resulting mixture was compressed by about 2.8 times the initial volume to manufacture a molded body with a size of 300*300*50 mm$^3$ (volume 4.5 L).

The molded body manufactured was dried at 200° C. in a convection dryer oven for 4 hours to manufacture a closed cell expanded perlite thermal insulator 2 having a density of 115±5 kg/m$^3$.

Example 3

Manufacture of Thermal Insulator 3 Using Closed Cell Expanded Perlite of the Present Invention The closed cell expanded perlite having a density of 30 kg/m$^3$ manufactured in Example 1 was prepared.

A mixed material was prepared by adding 1.5 wt % of an inorganic fiber based on the weight of the expanded perlite to 1,000 g of the closed cell expanded perlite manufactured as above and mixing the mixture.

A liquid inorganic binder was prepared by adding 0.5 wt % of a silicon-based water repellent based on the weight of the sodium silicate to 1,000 g of 33Be' sodium silicate and mixing the mixture.

352 g of the mixed material prepared as above and 317 g of the liquid inorganic binder prepared as above were mixed and then the resulting mixture was compressed by about 2.5 times the initial volume to manufacture a molded body with a size of 300*300*50 mm$^3$ (volume 4.5 L).

The molded body manufactured was dried at 200° C. in a convection dryer oven for 4 hours to manufacture a closed cell expanded perlite thermal insulator 3 having a density of 100±5 kg/m$^3$.

Example 4

Manufacture of Thermal Insulator 4 Using Closed Cell Expanded Perlite of the Present Invention 0.5 wt % of methyltrimethoxysilane based on the weight of the expanded perlite was coated on the closed cell expanded perlite having a density of 30 kg/m$^3$ manufactured in Example 1 to manufacture a closed cell expanded perlite.

A mixed material was prepared by adding 1.5 wt % of an inorganic fiber to 1,000 g of the coated closed cell expanded perlite based on the weight of the expanded perlite and mixing the mixture.

1,000 g of 33Be' sodium silicate was alone prepared as a liquid inorganic binder.

459 g of the mixed material prepared as above and 413 g of the liquid inorganic binder prepared as above were mixed and then the resulting mixture was compressed by about 3.1 times the initial volume to manufacture a molded body with a size of 300*300*50 mm$^3$ (volume 4.5 L).

The molded body manufactured was dried at 200° C. in a convection dryer oven for 4 hours to manufacture a closed cell expanded perlite thermal insulator 4 having a density of 130±5 kg/m$^3$.

Example 5

Manufacture of Thermal Insulator 5 Using Closed Cell Expanded Perlite of the Present Invention The closed cell expanded perlite having a density of 30 kg/m$^3$ manufactured in Example 1 was prepared.

A mixed material was prepared by adding 1.5 wt % of an inorganic fiber based on the weight of the expanded perlite to 1,000 g of the closed cell expanded perlite manufactured as above and mixing the mixture.

A liquid inorganic binder was prepared by adding 0.5 wt % of a silicon-based water repellent based on the weight of the sodium silicate to 1,000 g of 33Be' sodium silicate and mixing the mixture.

352 g of the mixed material prepared as above and 317 g of the liquid inorganic binder prepared as above were mixed and then the resulting mixture was treated with 3 wt % of fumed silica based on the weight of the mixed material and again mixed, and then compressed by about 2.5 times the initial volume to manufacture a molded body with a size of 300*300*50 mm$^3$ (volume 4.5 L).

The molded body manufactured was dried at 200° C. in a convection dryer oven for 4 hours to manufacture a closed cell expanded perlite thermal insulator 5 having a density of 100±5 kg/m$^3$.

Comparative Example 1

Manufacture of Thermal Insulator 1 Using Open Cell Expanded Perlite in the Related Art Perlite regular stone was used, and open cell expanded perlite in the related art was manufactured, the expanded perlite having a density of 40 kg/m$^3$ and a particle size distribution that 10 wt % of particles with a size of more than 800 μm, 35 wt % of particles with a size of 500 to 800 μm, 25 wt % of particles with a size of 250 to 500 μm, 15 wt % of particles with a size of 160 to 250 μm and 15 wt % of particles with a size of less than 160 μm are present based on the total weight of the expanded perlite.

A mixed material was prepared by adding 1.5 wt % of an inorganic fiber based on the weight of the expanded perlite to 1,000 g of the open cell expanded perlite in the related art manufactured as above and mixing the mixture.

A liquid inorganic binder was prepared by adding 0.5 wt % of a silicon-based water repellent based on the weight of the sodium silicate to 1,000 g of 33Be' sodium silicate and mixing the mixture.

635 g of the mixed material prepared as above and 571 g of the liquid inorganic binder prepared as above were mixed and then the resulting mixture was compressed by about 3.5 times the initial volume to manufacture a molded body with a size of 300*300*50 mm$^3$ (volume 4.5 L).

The molded body manufactured was dried at 200° C. in a convection dryer oven for 4 hours to manufacture an open cell expanded perlite thermal insulator 1 having a density of 180±5 kg/m$^3$.

Comparative Example 2

Manufacture of Thermal Insulator 2 Using Open Cell Expanded Perlite in the Related Art The open cell expanded perlite having a density of 40 kg/m$^3$ manufactured in Comparative Example 1 was prepared.

A mixed material was prepared by adding 1.5 wt % of an inorganic fiber based on the weight of the expanded perlite to 1,000 g of the open cell expanded perlite in the related art manufactured as above and mixing the mixture.

A liquid inorganic binder was prepared by adding 0.5 wt % of a silicon-based water repellent based on the weight of the sodium silicate to 1,000 g of 33Be' sodium silicate and mixing the mixture.

459 g of the mixed material prepared and 413 g of the liquid inorganic binder were mixed and then the resulting mixture was compressed by about 3.2 times the initial volume to manufacture a molded body with a size of 300*300*50 mm$^3$ (volume 4.5 L).

The molded body manufactured was dried at 200° C. in a convection dryer oven for 4 hours to manufacture an open cell expanded perlite thermal insulator 2 having a density of 130±5 kg/m$^3$.

Comparative Example 3

Manufacture of Thermal Insulator 3 Using Open Cell Expanded Perlite in the Related Art In order to compare the closed cell expanded perlite of the present invention with the open cell expanded perlite in the related art in the same density, when the expanded perlite in the related art was expanded at the same density as that of the expanded perlite in Example 1 of the present invention but the density is dropped to 35 kg/m$^3$ or less, the expanded perlite which was rather overexpanded became weak and thus was being expanded but crushing occurred thereafter, thereby increasing the density again.

Therefore, particles having a density of 35 kg/m$^3$ were analyzed and as a result, the particle size of expanded perlite was entirely increased and thus an open cell expanded perlite in the related art was manufactured, the expanded perlite having a density of 35 kg/m$^3$ and a particle size distribution that 15 wt % of particles with a size of more than 800 μm, 40 wt % of particles with a size of 500 to 800 μm, 20 wt % of particles with a size of 250 to 500 μm, 10 wt % of particles with a size of 160 to 250 μm and 15 wt % of particles with a size of less than 160 μm are present based on the total weight of the expanded perlite.

A mixed material was prepared by adding 1.5 wt % of an inorganic fiber based on the weight of the expanded perlite to 1,000 g of the open cell expanded perlite in the related art manufactured as above and mixing the mixture.

A liquid inorganic binder was prepared by adding 0.5 wt % of a silicon-based water repellent based on the weight of the sodium silicate to 1,000 g of 33Be' sodium silicate and mixing the mixture.

635 g of the mixed material prepared as above and 571 g of the liquid inorganic binder prepared as above were mixed and then the resulting mixture was compressed by about 3.8 times the initial volume to manufacture a molded body with a size of 300*300*50 mm³ (volume 4.5 L).

The molded body manufactured was dried at 200° C. in a convection dryer oven for 4 hours to manufacture an open cell expanded perlite thermal insulator 3 having a density of 180±5 kg/m³.

Comparative Example 4

Manufacture of Thermal Insulator 4 Using Open Cell Expanded Perlite in the Related Art The open cell expanded perlite having a density of 35 kg/m³ manufactured in Comparative Example 3 was prepared.

A mixed material was prepared by adding 1.5 wt % of an inorganic fiber based on the weight of the expanded perlite to 1,000 g of the open cell expanded perlite in the related art manufactured as above and mixing the mixture.

A liquid inorganic binder was prepared by adding 0.5 wt % of a silicon-based water repellent based on the weight of the sodium silicate to 1,000 g of 33Be' sodium silicate and mixing the mixture.

459 g of the mixed material prepared as above and 413 g of the liquid inorganic binder prepared as above were mixed and then the resulting mixture was compressed by about 3.3 times the initial volume to manufacture a molded body with a size of 300*300*50 mm³ (volume 4.5 L).

The molded body manufactured was dried at 200° C. in a convection dryer oven for 4 hours to manufacture an expanded perlite thermal insulator 4 having a density of 130±5 kg/m³.

Comparative Example 5

Manufacture of Thermal Insulator 5 Using Open Cell Expanded Perlite in the Related Art In order to compare the closed cell expanded perlite of the present invention with the expanded perlite in the related art in the same particle size, expanded perlite in the related art was intended to be manufactured in the same particle size as that of the expanded perlite in Example 1 of the present invention, but the expanded perlite with a density of 51 kg/m³ was manufactured in the same or similar particle size.

When the density was reduced in order to compare the expanded perlite thermal insulators in a similar density, the particle size was again increasing and thus the particle size was close to the particle size of the expanded perlite used in Comparative Example 1.

Accordingly, during the expansion with a density less than 51 kg/m³, a target particle size could not be obtained and thus an expanded perlite was manufactured, the expanded perlite having a density of 51 kg/m³ and a particle size distribution that 15 wt % of particles with a size of more than 400 μm, 40 wt % of particles with a size of 250 to 400 μm, 20 wt % of particles with a size of 160 to 250 μm and 30 wt % of particles with a size of less than 160 μm are present based on the total weight of the expanded perlite.

A mixed material was prepared by adding 1.5 wt % of an inorganic fiber based on the weight of the expanded perlite to 1,000 g of the expanded perlite manufactured as above and mixing the mixture.

A liquid inorganic binder was prepared by adding 0.5 wt % of a silicon-based water repellent based on the weight of the sodium silicate to 1,000 g of 33Be' sodium silicate and mixing the mixture.

In order to manufacture an expanded perlite thermal insulator having a density of 130±5 kg/m³ as in Example 1, 459 g of the mixed material prepared as above and 413 g of the liquid inorganic binder prepared as above were mixed.

At this time, since the density of expanded perlite per se was as high as 51 kg/m³, the volume before compression was low and the compression ratio was increased by about 2 times and thus a molded body with a size of 300*300*50 mm³ (volume 4.5 L) was manufactured.

The molded body manufactured was dried at 200° C. in a convection dryer oven for 4 hours to manufacture an open cell expanded perlite thermal insulator 5 having a density of 130±5 kg/m³.

Comparative Example 6

Manufacture of Thermal Insulator 6 Using Open Cell Expanded Perlite in the Related Art Expanded perlite with a density of 51 kg/m³ manufactured in Comparative Example 5 was prepared.

A mixed material was prepared by adding 1.5 wt % of an inorganic fiber based on the weight of the expanded perlite to 1,000 g of the expanded perlite manufactured as above and mixing the mixture.

A liquid inorganic binder was prepared by adding 0.5 wt % of a silicon-based water repellent based on the weight of the sodium silicate to 1,000 g of 33Be' sodium silicate and mixing the mixture.

In order to manufacture an expanded perlite thermal insulator having a density of 115±5 kg/m³ as in Example 2, 405 g of the mixed material prepared as above and 365 g of the liquid inorganic binder prepared as above were mixed.

In order to manufacture a molded body with a size of 300*300*50 mm³ (volume 4.5 L), the compression ratio during compression molding was increased only by 1.7 times compared to the volume, and the molding strength of the product was almost as low as zero and the molded body was crushed when it was released from the molding die and thus the molded body could not be manufactured.

Experimental Example 1

Analysis of Characteristics of Expanded Perlite Thermal Insulator

The thermal conductivity, flexural strength, linear shrinkage and water repellency of expanded perlite thermal insulators in the Examples and Comparative Examples were measured and analyzed in accordance with KS F 4714 and the results are shown in the following Table 1.

TABLE 1

| Classification | Molding compression ratio | Linear shrinkage | Thermal conductivity (W/mK, based on 70° C.) | Flexural strength (N/cm²) | Water repellency (%) |
|---|---|---|---|---|---|
| Example 1 | 3.2 | Within 2% | 0.051 | 26.4 | 99.5% or more |
| Example 2 | 2.8 | | 0.050 | 25.8 | |
| Example 3 | 2.5 | | 0.048 | 25.1 | |
| Example 4 | 3.1 | | 0.051 | 26.3 | |
| Example 5 | 2.5 | | 0.048 | 26.1 | |
| Comparative Example 1 | 4 | Within 2% | 0.061 | 25.3 | |

TABLE 1-continued

| Classification | Molding compression ratio | Linear shrinkage | Thermal conductivity (W/mK, based on 70° C.) | Flexural strength (N/cm²) | Water repellency (%) |
|---|---|---|---|---|---|
| Comparative Example 2 | 3.2 | 4.1% | 0.055 | 17.5 | |
| Comparative Example 3 | 4.3 | Within 2% | 0.064 | 24.5 | |
| Comparative Example 4 | 3.3 | 3.4% | 0.057 | 17.2 | |
| Comparative Example 5 | 2 | 3.7% | 0.065 | 19.8 | |
| Comparative Example 6 | 1.7 | Impossible to be molded | | | |

Further, in order to additionally compare the effects according to the water repellent treatment, comparison was made between Example 1 and Example 4 by using a method of measuring absorptivity in accordance with KS M 3809.

A test was performed by removing the top skin, cutting into three test specimens with a size of 100 mm×100 mm×25 mm, dipping the specimens 50 mm below from the surface of clean water at 23±3° C., pulling out the test specimens 10 seconds later, allowing the test specimens to stand on an iron net with a mesh size of 3 mm, which was inclined at 30° from the vertical line for 30 seconds, then measuring the weight with the precision of 0.01 g to use the weight as a reference weight, again dipping the test specimens in clean water and allowing the specimens to absorb moisture for 24 hours, measuring the weight by a method of measuring the reference weight, and dividing the difference between the weight and the reference weight by the surface area, and then the results are shown in the following Table 2.

TABLE 2

| Classification | Amount of moisture absorbed (g/cm²) |
|---|---|
| Example 1 | 8.2 |
| Example 4 | 3.1 |

As shown in the Table 1 and Table 2, the thermal insulators in Examples 1, 2 and 3 of the present invention have much lower thermal conductivities and lower densities than those of the thermal insulator in the related art in Comparative Example 1, but flexural strengths were entirely higher than that of the thermal insulator in the related art in Comparative Example 1.

In addition, the density in Comparative Example 2 was the same as that in Example 1 of the present invention by introducing the same amount as the amount in Example 1, but the thermal conductivity in Comparative Example 2 was lower than that in Comparative Example 1 and higher than that in Example 1, and the strength in Comparative Example 2 rather deteriorated and thus the value as a product was depreciated.

Comparison was intended to be made with an expanded perlite molded product of the present invention by manufacturing an expanded perlite having the same density and particle size structure as those of the present invention, but it was impossible to manufacture the product as inserted in Comparative Examples as described above.

In Comparative Examples 3 and 4 in which the density was intended to be reduced to 30 kg/m³ under the conditions of the expanded perlite in the related art, the amount of open cell expanded perlite was increased due to overexpansion of expanded perlite and thus the strength of particles per se was decreased, thereby rather deteriorating thermal conductivity and flexural strength compared to Comparative Examples 1 and 2.

The influence exerted according to whether the surface of expanded perlite of the present invention is a closed cell shape or an open shell shape, may be clearly confirmed.

In Comparative Examples 5 and 6 in which the particle size under the conditions of expanded perlite in the related art was intended to be changed to have the particle size distribution structure of the present invention, it was impossible to achieve the purpose with products with a low density and it was possible to achieve the purpose when the density was 51 kg/m³.

However, this result looks similar in appearance to the result in the expanded perlite of the present invention simply in consideration of the particle size distribution, but the thermal conductivity becomes rather high due to the thick wall between internal cells of particles and high density and the molding compression ratio becomes greatly low due to the small volume, thereby also causing a defective molding.

In addition, referring to Example 1 and Comparative Examples 2 and 4, the densities were 30 kg/m3, 40 kg/m3 and 35 kg/m3 in Example 1, Comparative Example 2, and Comparative Example 4, respectively. Although the volume in Example 1 is the highest for the same weight introduced, a compression ratio was lower than or similar to those of the Comparative Examples.

As previously mentioned, it can be known that the appropriate particle size and the smooth surface allowed the closed cell expanded perlite of the present invention to be compactly introduced into the molding mold.

Water repellency was entirely good and thus the difference between the silicon-based water repellent and the silane monomer-based water repellent in Example 4 was not compared. However, referring to the comparison of absorptivities in Table 2, it can be known that the absorptivity was low when each particle was coated with the silane monomer-based water repellent.

It can be known that the use of fumed silica improved the strength in Example 5 compared to Example 3.

Through the Examples, it can be known that the thermal insulator using the closed cell expanded perlite of the present invention has the excellent strength and the decreased thermal conductivity in a low density.

Although the Examples and Experimental Examples, particularly, the structural configuration and the like have been described, this does not limit the scope thereof, and it can be understood by those skilled in the art to which the present invention pertains that modifications may be made within the scope of the present invention without departing from the spirit thereof.

The invention claimed is:

1. A thermal insulator comprising:
    10 to 84 wt % of expanded perlite containing an amount of 50 wt % or more of a closed cell expanded perlite based on a total weight of expanded perlite manufactured by expanding a raw ore of perlite,
    15 to 85 wt % of a liquid binder and 0.25 to 5 wt % of a reinforced wherein the expanded perlite has a bulk density in a range from 20 to 40 g/l and a particle size distribution, based on total weight of the expanded perlite, of:
    15±10 wt % of particles with a size of more than 400 μm,
    40±15 wt % of particles with a size of 250 to 400 μm, and
    20±10 wt % of particles with a size of less than 160 μm.

2. The thermal insulator of claim 1, wherein the raw ore of the expanded perlite is one selected from the group consisting of pearlstone, obsidian, pitchstone and pumice.

3. The thermal insulator of claim 1, wherein the liquid binder is one or two selected from the group consisting of inorganic binders and organic binders.

4. The thermal insulator of claim 1, wherein the reinforced fiber is one or two selected from the group consisting of inorganic fibers and organic fibers.

5. The thermal insulator of claim 4, wherein the inorganic fiber is one selected from the group consisting of glass fibers, silica alumina-based fibers, zirconia fibers and carbon fibers.

6. The thermal insulator of claim 1, further comprising a water repellent, wherein the water repellent further comprises one coating film selected from the group consisting of glass silane-based coupling agents, titanate-based coupling agents and zirconate-based coupling agents.

7. A method for manufacturing a thermal insulator, comprising:
- a first step of manufacturing expanded perlite containing an amount of more than 50 wt % of a closed cell expanded perlite based on a total weight of expanded perlite manufactured by expanding a raw ore of perlite;
- a second step of preparing a mixed material by adding 15 to 85 wt % of a liquid binder and 0.025 to 5 wt % of a reinforced fiber to 10 to 84 wt % of the expanded perlite manufactured in the first step and mixing the resulting mixture;
- a third step of manufacturing a molded body by compressing the mixed material prepared in the second step; and
- a fourth step of drying the molded body manufactured in the third step, wherein the expanded perlite has a bulk density in a range from 20 to 40 g/l and a particle size distribution, based on the total weight of the expanded perlite, of 15±10 wt % of particles with a size of more than 400 μm, 40±15 wt % of particles with a size of 250 to 400 μm, 20±10 wt % of particles with a size of 160 to 250 μm and 30±15 wt % of particles with a size of less than 160 μm.

8. The method for manufacturing a thermal insulator of claim 7, wherein in manufacturing of the expanded perlite in the first step, the perlite is expanded by one selected from the group consisting of a direct flame method and an indirect flame method.

9. The method for manufacturing a thermal insulator of claim 7, wherein in manufacturing the molded body in the third step, the molded body is manufactured by further subjecting the mixed material in the second step to a body compact filling method which imparts vibration or shock and then compressing the mixed material.

10. The method for manufacturing a thermal insulator of claim 7, wherein in preparing the mixed material in the second step, the liquid binder is one or two selected from the group consisting of inorganic binders and organic binders.

11. The method for manufacturing a thermal insulator of claim 7, wherein in manufacturing the mixed material in the second step, the reinforced fiber is one or two selected from the group consisting of inorganic fibers and organic fibers.

12. The method for manufacturing a thermal insulator of claim 11, wherein the inorganic fiber is one selected from the group consisting of glass fibers, silica alumina-based fibers, zirconia fibers and carbon fibers.

13. The method for manufacturing a thermal insulator of claim 7, wherein in preparing the mixed material in the second step, the mixed material is prepared by further adding one or more selected from the group consisting of a water repellent, a reinforcing agent and a radiant heat blocking agent thereto.

14. The method for manufacturing a thermal insulator of claim 13, wherein a surface of the water repellent is coated with one selected from the group consisting of organic silane-based coupling agents, titanate-based coupling agents and zirconate-based coupling agents.

15. The method for manufacturing a thermal insulator of claim 13, wherein the reinforcing agent is one selected from the group consisting of fumed silica and white carbon.

* * * * *